Figure 12:
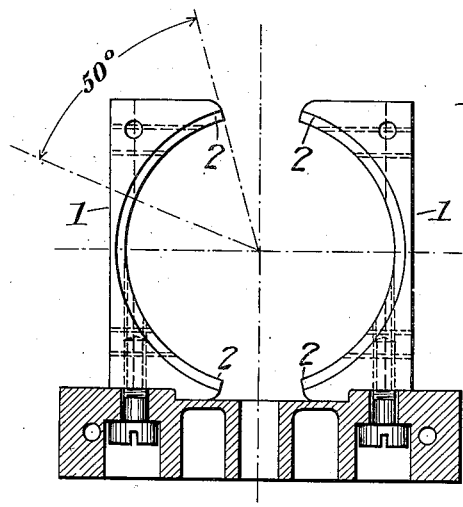

G. HONOLD.
APPARATUS FOR IGNITION OF REVERSIBLE INTERNAL COMBUSTION MOTORS.
APPLICATION FILED MAR. 19, 1910.
1,105,787.
Patented Aug. 4, 1914.
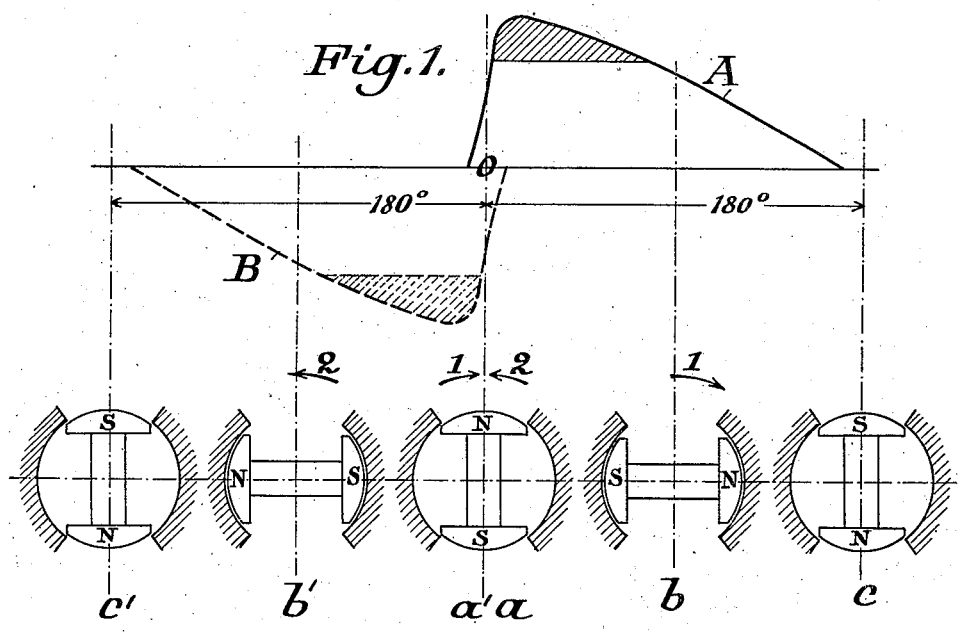
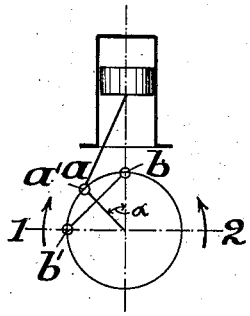
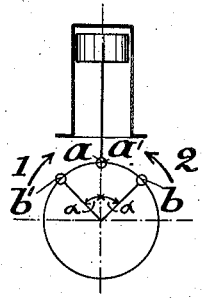
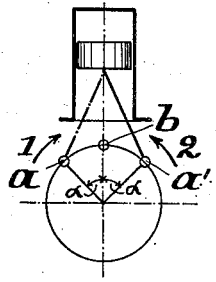

G. HONOLD.
APPARATUS FOR IGNITION OF REVERSIBLE INTERNAL COMBUSTION MOTORS.
APPLICATION FILED MAR. 19, 1910.
1,105,787.
Patented Aug. 4, 1914.
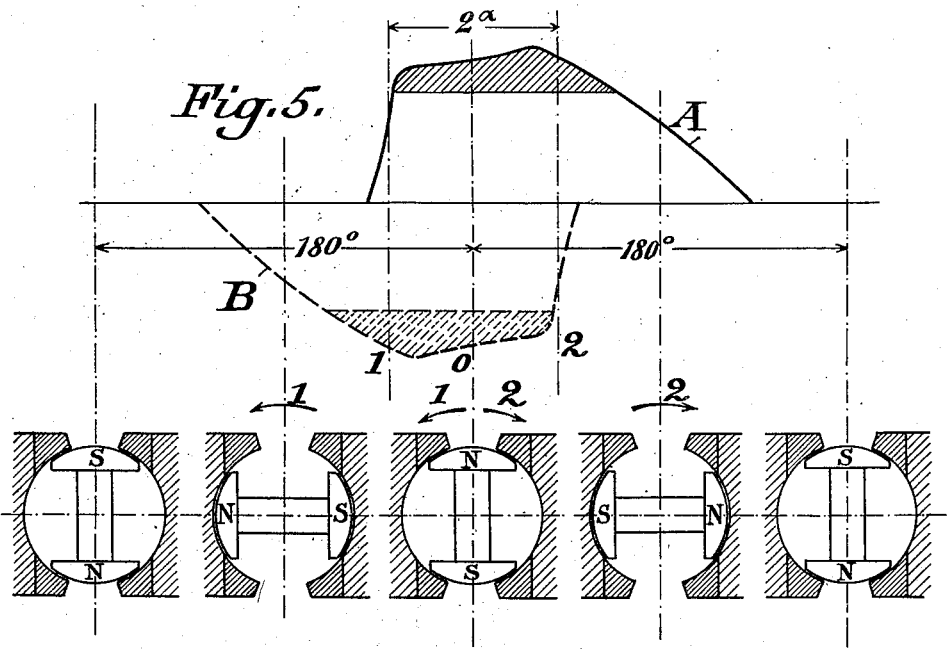
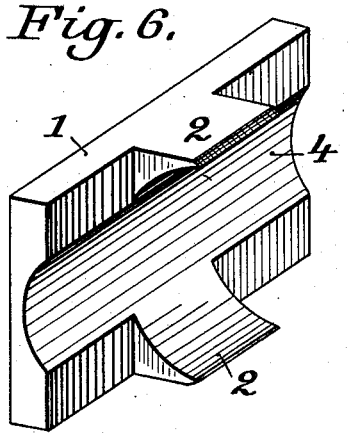
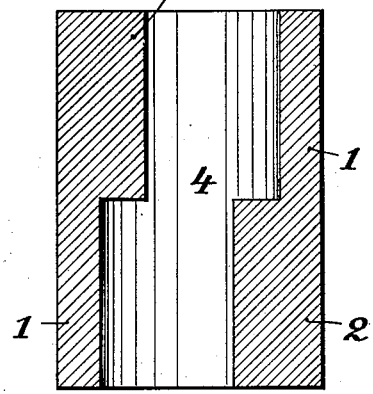

G. HONOLD.
APPARATUS FOR IGNITION OF REVERSIBLE INTERNAL COMBUSTION MOTORS.
APPLICATION FILED MAR. 19, 1910.
1,105,787.
Patented Aug. 4, 1914.
7 SHEETS—SHEET 3.
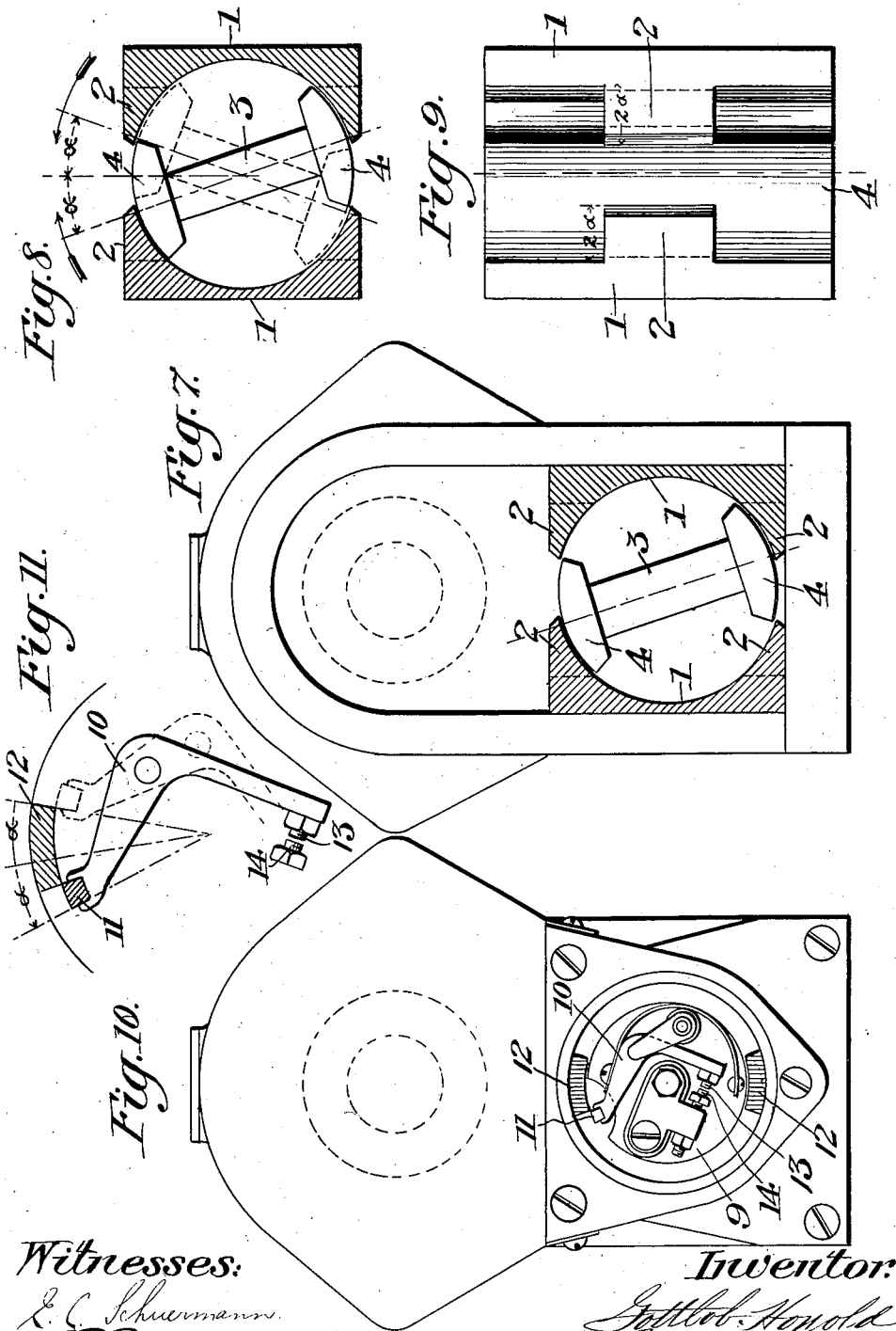

G. HONOLD.
APPARATUS FOR IGNITION OF REVERSIBLE INTERNAL COMBUSTION MOTORS.
APPLICATION FILED MAR. 19, 1910.

1,105,787.

Patented Aug. 4, 1914.

7 SHEETS—SHEET 4.

G. HONOLD.
APPARATUS FOR IGNITION OF REVERSIBLE INTERNAL COMBUSTION MOTORS.
APPLICATION FILED MAR. 19, 1910.
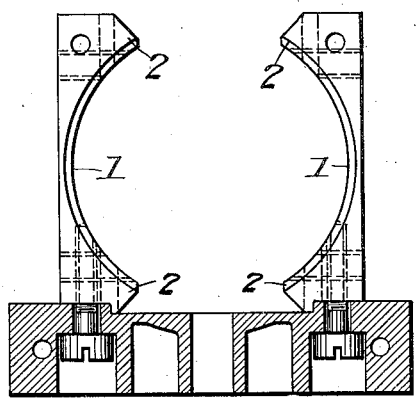
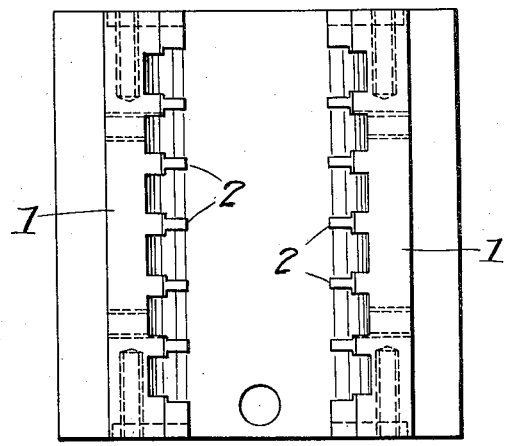

G. HONOLD.
APPARATUS FOR IGNITION OF REVERSIBLE INTERNAL COMBUSTION MOTORS.
APPLICATION FILED MAR. 19, 1910.

1,105,787.

Patented Aug. 4, 1914.

7 SHEETS—SHEET 6.

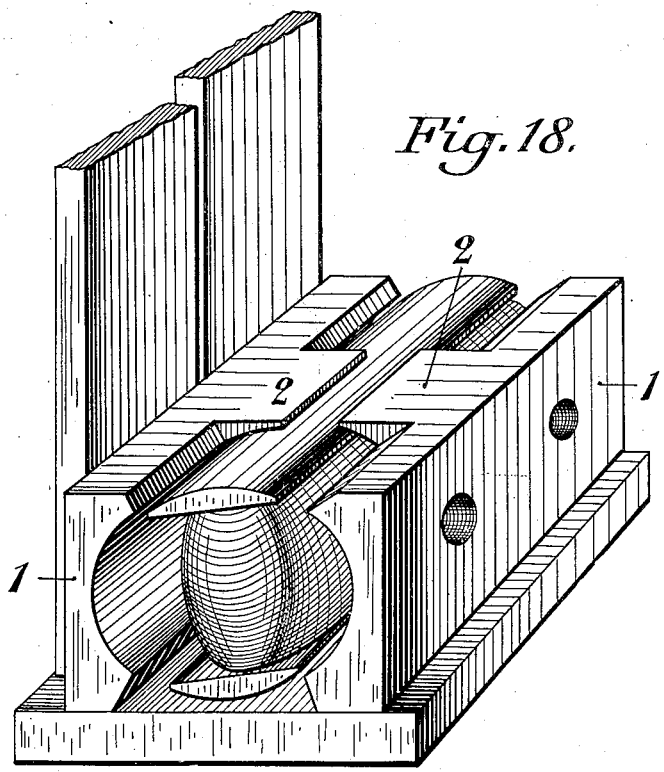

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

APPARATUS FOR IGNITION OF REVERSIBLE INTERNAL-COMBUSTION MOTORS.

1,105,787. Specification of Letters Patent. Patented Aug. 4, 1914.

Application filed March 19, 1910. Serial No. 550,461.

*To all whom it may concern:*

Be it known that I, GOTTLOB HONOLD, a subject of the German Emperor, residing at Stuttgart, Germany, have invented certain new and useful Improvements in Apparatus for Ignition of Reversible Internal-Combustion Motors; and I do hereby declare the following to be a full, clear, and exact description of the invention, such as will enable others skilled in the art to which it appertains to make and use the same.

The invention has for its object to provide an improved and efficient mechanism for igniting the gaseous mixture of internal combustion motors which operate in both directions, viz. reversible motors, which employ a magneto electric generator as a source of current supply.

In explosive engines, which run in both directions, the employment of a magneto electric generator as a source of current for igniting the explosive mixture in the engine cylinder renders it difficult to effect ignition of the mixture at the proper instant to effect an efficient operation of the engine, in either direction, if the distinct and recognized advantage incident to regulating and adjusting the ignition period is not to be abandoned.

With the abandonment of the possibility of adjusting the ignition period, it is feasible to effect ignition of the gaseous mixture in explosive engines of this type with the usual form of magneto electric ignition apparatus, heretofore employed, if the spark is produced in the engine cylinder when the piston reaches its upper dead center. This system of ignition of reversible engines is objectionable and uneconomical, however, because the extremely rapid movement of the piston, more especially in high speed engines, results in the fact that the piston has already begun its downward movement before a complete combustion of the gaseous mixture is obtained, by reason of which fact the operation of the engine is unfavorably influenced. That is to say, complete ignition and combustion of the gaseous mixture in the cylinder is effected only after the piston has completed a portion of its power stroke, with the result that much of the effective power of the explosive mixture is lost. This difficulty was early recognized in gas engine practice, and was corrected in respect of non-reversing engines, viz. engines operating in one direction only, by advancing the spark, or effecting an early ignition by firing the gaseous mixture before the piston reaches the end of its compression stroke or the end of its rearward travel.

If the economical advantage of advanced ignition is to be maintained in internal combustion engines which operate in both directions, it is found necessary to adjust the magneto electric apparatus for each reversal of the engine, so as to cause an igniting spark to be developed at the proper period in the engine stroke. Such an adjustment, however, has been found not only difficult but in most cases impracticable.

It is the purpose of the present invention to provide an ignition apparatus for internal combustion engines operated in both directions, which is effective in producing the igniting spark at the proper point in the piston travel, irrespective of the direction of movement of the engine, and to this end the invention comprises the apparatus and the mode or method of operation, hereinafter more particularly described, and illustrated in the accompanying drawings, in which—

Figure 13:
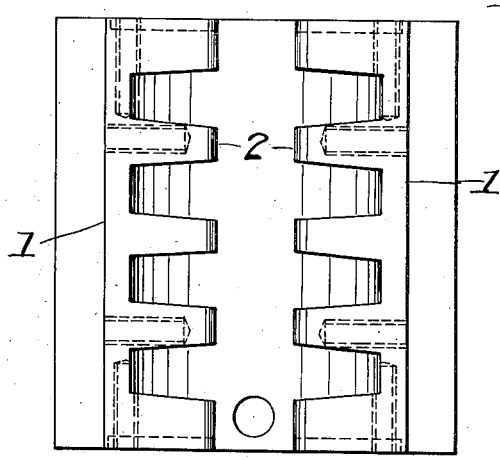
Figure 16:
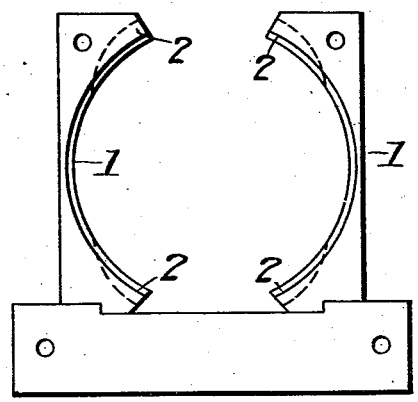
Figure 17:
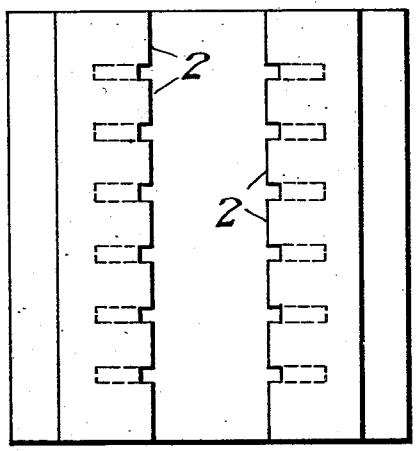

Figure 1 illustrates the characteristic current curves developed by the common form of magneto generator, heretofore employed for developing a sparking current for internal combustion engines and also the diagrammatic views of the old form of magneto generator, showing the relative positions of the armature and fields, for the maxima and minima of the said current curves. The armature core is wound with turns of wire between the head pieces of the core in a plane at right angles to the drawing, as is customary in such types of magneto-electric machines. Fig. 2 is a diagrammatic representation of an engine operating with advanced ignition, in one direction only. Fig. 3 is a similar view illustrating the ignition point of a reversible engine. Fig. 4 is a similar view showing the relative ignition points, measured on the crank travel of a reversible engine, in which the present invention is applied. Fig. 5 is a diagrammatic view showing the relative positions of the magneto armature and field, and the characteristic overlapping current curves developed thereby, between the ignition periods, for forward and backward rotation of the engine. Fig. 6 is a perspective view of one of the magnet poles of the magneto generator constructed in accordance with the present invention. Fig. 7 is an end elevation partly in section of the improved magneto electric machine. Fig. 8 is a vertical section through the pole pieces of the generator, indicating the relative positions of the armature for the advanced ignition periods in both directions. Fig. 9 is a plan view of Fig. 8. Fig. 9ª is a horizontal cross section through the pole pieces showing a slightly modified form. Fig. 10 is an end view of the magneto generator showing the current interrupter. Fig. 11 is an enlarged view of the effective parts of the current interrupter. Figs. 12 and 13 are an end view partly in section and a plan view of the pole pieces showing a further modification. Figs. 14 and 15 are an end view partly in section and a plan view of the pole pieces showing a further modification. Figs. 16 and 17 are an end view and a plan view of the pole pieces showing a further modification. Fig. 18 is a perspective view showing the permanent magnets, the pole pieces and the armature with its winding thereon.

Before reaching the vertical position shown in $a$ of Fig. 1, the magnetic lines of force pass from one pole of the stationary magnet through the heads and cross-bar of the armature core and thence to the other magnet pole. In position $a$ of Fig. 1, the main path of the lines of force is from the same pole of the stationary magnet through both heads of the armature core, but not through the cross-bar, and into the other magnet pole. In position $b$ of Fig. 1, the path is from the same pole of the stationary magnet through the heads and cross-bar of the armature core into the other magnet pole. While the lines of force retain their fixed direction between the poles of the stationary magnet, their direction through the armature core is reversed on the two sides of the vertical line shown in Fig. 1. That is, if before reaching the position shown in $a$ of Fig. 1, the direction of the lines of force between the magnet poles is through the armature core from N to S, then after passing that position as in $b$ of Fig. 1, they pass from S to N. Now in passing from one side of the vertical to the other, the magnetic lines of force quickly alter their path through the armature core, thereby suddenly cutting the turns of wire and generating in them an electromotive force which rises rapidly to a maximum value. On further rotation the lines of force again alter their path through the armature core, but at a rate which is less rapid than before on account of the magnetic lag during the period of increasing lines of force through the core. The electromotive force, therefore, falls at a rate less rapid than it rises and finally it approaches zero intensity at about position $c$ of Fig. 1. Upon rotation in the direction of arrow 2 of Fig. 1, the same variation of the electromotive force is obtained, but the sign is reversed with respect to the previous variation. Since the current produced is directly proportional to the electromotive force generated, the ordinates of the curves A and B represent the current intensity produced at the corresponding armature positions indicated below, and are similar to each other in every respect except that they are reversed. In Fig. 1, curve A represents the current curve produced by rotation to the right, as indicated by arrow 1, and curve B represents the current curve produced by rotation to the left, as indicated by arrow 2. Due to the inductive effect in the armature turns, which is common in the ordinary types of magneto-electric generators employing a shuttle armature, the current lags behind the electromotive force generated, resulting in the phenomenon that the maximum intensities of the current curves A and B occur after O, corresponding to the position $a$—$a'$ of Fig. 1. Now, assuming that the electromotive force sufficient to generate a spark produces a current of greater intensity than indicated by the horizontal line of the shaded area, then an ignition spark may be obtained when the magneto-armature has any position substantially between $a$ and $b$ of Fig. 1 for rotation to the right, and substantially between $a'$ and $b'$ of Fig. 1 for rotation to the left. Thus there is obtained for each direction of rotation of the armature, a current curve A or B, each having a maximum corresponding approximately to the position $a$—$a'$ of Fig. 1. In accordance with the old practice, the coincident position $a$—$a'$ approximately corresponds to the advanced sparking or ignition point for both directions of rotation of the engine, while the positions $b$ and $b'$ approximately correspond to the possible periods of late or retarded ignition.

Applying the particular conditions, predicated upon the ordinary type of magneto electric generator to an internal combustion engine, the relation of the ignition period to the stroke of the engine may be illustrated by a diagram as in Fig. 2. Assuming that the engine runs in the direction of the arrow 1, viz. to the right, then the explosive mixture will be ignited, while the crank of the engine is in the position $a$, if the requirements of advanced ignition are to be maintained, and the explosive force of the gaseous mixture is to be utilized during the full working stroke of the piston. This position of the crank corresponds to the position $a$ of the armature in Fig. 1 and the capability of adjustment of the advanced ignition period lies between the crank positions $a$ and $b$ in Fig. 2, which accords with the hereinbefore described relation between the magneto electric generator and the engine, and a corresponding efficient operation of the engine. On the other hand, if the engine is run in the opposite direction, to wit, to the left, as indicated by the arrow 2, in Fig. 2, ignition of the gaseous mixture is effected at the position of the crank $a'$, coincident with $a$, for the reason that the generator furnishes the necessary current for the ignition spark only at the position of the armature corresponding to that crank position. It will be seen, however, that the ignition period no longer lies in the compression stroke of the piston, as in the foregoing case when the engine was considered as running to the right, but in the working stroke of said piston, which is directly contrary to the conditions required for an efficient motor output. At the time ignition is effected, the piston has already traversed part of its outward or working stroke. If this objection is sought to be overcome by changing the driving connection between the engine and the magneto, by adjusting the toothed gearing or similar operating connection between the parts to cause the magneto electric machine to develop a sparking current at the dead center of the engine, as in Fig. 3, still further unfavorable conditions arise, for the reason that while, in the case illustrated in Fig. 2, the engine operates efficiently when running in a right hand direction, because of the possibility of advanced ignition, in the case illustrated in Fig. 3, the result is unfavorable from all aspects, for the reason that complete combustion of the gaseous mixture cannot be effected until the piston has completed part of its power stroke, whether the engine be running to the right or to the left. From the foregoing, it is apparent that magneto electric generators, as heretofore employed in connection with explosive engines, cannot be successfully or efficiently applied to such engines when the latter are to be run in both directions.

Assuming that the normal advanced ignition of the gaseous mixture occurs during the compression stroke of the piston when the crank occupies the position $a$ in Figs. 2 and 4, forming an angle $\alpha$ with a line through the dead centers, it will be apparent that if the normal advanced ignition periods for an engine running in both directions be displaced by an angular distance equal to $2\alpha$, to wit twice the angular displacement of either advanced ignition point from the dead center, as illustrated in Fig. 4, the difficulties heretofore encountered in applying a magneto generator for igniting the reversible explosion motors will be avoided.

As illustrated in Fig. 4, advanced ignition may be effected for any position of the crank between points $a$ and $b$ which define the limits of the angle $\alpha$ in the crank travel if the engine is running to the right, and similarly between the points $a'$ and $b$, indicating a similar angle $\alpha$, if the engine runs to the left, while retarded ignition may be effected at any position between the dead center or position $b$ of the crank and the point $a'$ or the point $a$, depending upon whether the rotation is to the right or to the left, respectively. In other words, to fulfil the conditions of operation indicated diagrammatically in Fig. 4, advanced ignition, for either direction of rotation of the engine, takes place during the latter part of the compression stroke of the piston, while retarded ignition is effected during the working stroke which agrees with the conditions of operation most favorable for an efficient motor output. In order to effect this operation, however, a special form or relation of the field and armature of the magneto-generator is necessary so as to produce in the direction of arrow 1 in Fig. 4, a current curve rising to a substantial maximum at a point corresponding to the crank position $a$, and in the reverse direction, as indicated by arrow 2 in Fig. 4, a current curve rising to a substantial maximum at the point corresponding to the crank position $a'$; and, furthermore, substantially sustaining in either direction of rotation throughout the angle $2\alpha$ the said maximum values. Then by causing the sustained maximum of the current curves to be of sufficient intensity, the ignition of the gaseous mixtures may be obtained at any point between $a$ and $a'$ for either direction of rotation, which curves therefore overlap throughout the period common to advanced ignition in both directions of rotation.

In order to produce current curves which have substantially sustained maximum values over this range, it is necessary to effect a substantially constant rate of cutting between the armature turns and the magnetic lines of force as the armature rotates through the corresponding angular position. This may be accomplished in a magneto-electric generator by providing either the pole pieces of the stationary magnet or the armature core heads or both with extensions of reduced section, so arranged as to produce an overlap between the coacting armature core and pole pieces equal in the aggregate to the angle $2\alpha$ measured on the crank travel. In the accompanying drawings, I have illustrated, in several modified forms, pole pieces provided with such overlapping extensions, in accordance with the invention, but it will be understood that the invention is in nowise limited to these particular forms, and that the overlap may as well be effected by extending the armature core heads, the essential condition being that the number of lines of force passing from the pole piece to the armature shall be changed gradually instead of abruptly during the extended angular movement specified, as the armature passes through the vertical position, as has heretofore been the practice.

In a simple form of the apparatus, the pole pieces 1, 1 of the field magnet are provided with step-like extensions or projections 2, located at the upper and lower edges of said pieces so that when the armature 3 occupies any position intermediate those shown in full and dotted lines in Fig. 8, there will be a mutual overlapping of those polar extensions 2 and the armature faces through an angular distance equal to $2\alpha$, under which conditions the current developed will be that graphically illustrated in Fig. 5.

In Figs. 6, 9 and 18, a single projection is shown along each edge of the pole-pieces between the ends thereof. In Fig. 9$^a$, a single projection of approximately one-half the length of the pole-pieces extends from opposite ends thereof. In Figs. 12 and 13, there is shown a plurality of stepped projections extending along each edge of each pole-piece. In Figs. 14 and 15, the stepped projections along each edge of each pole-piece may be formed by removing the metal between the projections for a depth increasing toward the edge of the pole-pieces. In Figs. 16 and 17, the edges of the pole-pieces have projections which are formed of a plurality of steps. It will be understood that the projections along the adjacent edges of the two pole-pieces may be arranged in line with one another or may be offset from one another, the only essential condition being that the extent of the overlap corresponds, in the aggregate, with the range of adjustment of the ignition period desired. It will be apparent that the maximum value of the current curve will, by any of these forms of construction, whether such projections 2 are on the pole-pieces 1, or on the core-heads 4 of the armature core 3, or on both, be substantially sustained throughout a period corresponding in the aggregate, to the extent of the overlap, inasmuch as during the entire extent of the rotation in which only the projections on the pole-pieces overlap the armature core-heads, or vice versa, the magnetic lines of force are snapped across the armature winding. Consequently, during this entire extent of overlapping the voltage generated and the current curve have a substantially sustained maximum value. It is then only necessary to provide such magnetic structure and armature winding that the value of this sustained maximum is sufficient to produce the desired ignition spark at the spark plug in order to obtain ignition at any point within the angle corresponding to the extent of overlap, which may obviously be made equal to the angular adjustment required from extreme advanced ignition to extreme retarded ignition, or as designated herein, by two $\alpha$, and as particularly shown in Fig. 8.

Instead of forming the overlapping extensions on the pole face of the field magnets, it is obvious that they may be applied to the coacting faces of the armature, or both the field magnets and the armature may have mutually overlapping extensions, provided, of course, that the aggregate of the overlapping extensions shall equal the angular value $2\alpha$.

Closely associated with the special formation and relation of the pole faces and the armature of the magneto electric generator is the construction of the current interrupter, used in connection with machines of this type for breaking the current at the proper instant to effect the spark at the terminals of the spark plug of the engine. In Figs. 10 and 11, there is illustrated a convenient and efficient form of current interrupter, which is in its general features of construction the same as has been employed in this particular class of work. The interrupter or contact breaker is fitted upon the rear end of the machine and comprises a rotary disk 9 connected to the spindle or shaft of the armature, and carrying a spring-pressed bell-crank lever 10, one end of which carries a platinum contact point 13, which coöperates with an adjustable stationary contact 14. The forward end of the bell crank 10 carries a wiper 11 which coöperates with two stationary blocks 12 located substantially 180° apart on the frame of the magneto, so that as disk 9 rotates with the armature, the wiper 11, coming in contact with the blocks or abutments 12, moves bell crank lever 10 to separate contacts 13 and 14 and thereby interrupts the circuit from the magneto. As thus far described, the contact breaker or circuit interrupter is old. The novelty of this part of the invention, however, as applied to the construction and arrangement hereinbefore described, resides in constructing and arranging the wiper 11 and the block or abutments 12 so that the angle subtended by their joint contact surfaces, when in the position illustrated in Fig. 10, shall equal $2\alpha$, the degree of overlapping of the field pole and armature faces of the magneto for a corresponding position. In other words, the length of the contact face of each block 12 plus the width of the brush 11 is equal to the angular distance $2\alpha$, so that the current generated in the magneto armature will be interrupted at the contacts 13 and 14, for both directions of rotation of the armature, when current developed by the armature reaches its maximum. For example, if the machine illustrated in Fig. 10 is running to the right, the brush 11 engages block 12, when the armature occupies the position shown in Figs. 7 and 8 and is developing one maximum of current value, and interrupts the current by separating contacts 13 and 14. Similarly when the machine shown in Fig. 10 revolves to the left, the brush 11 engages the right hand edge of block 12 and interrupts the current, when the latter is at its opposite maximum, as indicated in Fig. 5.

From the foregoing, it will be seen that the magneto-generator will not only produce a current curve with a substantially sustained maximum intensity to effect the adjustable advanced ignition, but the interrupter is so constructed and arranged as to break the current produced by the magneto at the proper point, for both directions of rotation of the engine.

In the modification of the pole pieces illustrated in Fig. 9ª, the construction differs from that previously explained, only in the fact that the step-like projections or extensions 2 on the pole pieces are offset laterally with respect to each other.

In each of Figs. 12 to 17, the construction is slightly modified, without however departing from the characteristic feature of the invention, by providing the pole pieces with a series of step-like projections 2 at their upper and lower edges.

What I claim is:—

1. An electrical ignition system for the production of ignition sparks in either direction of rotation of a reversible internal combustion engine, comprising a magneto ignition machine adapted to generate a sustained voltage within the ignition range throughout the portion of the period of revolution of the engine corresponding approximately to the angular range of adjustment of the ignition period from advanced ignition to retarded ignition, measured on the crank travel, a spark plug or plugs, and means for distributing the generated voltage to the spark plug or plugs at advanced or retarded instants during the period of sustained voltage.

2. An electrical ignition system for the production of ignition sparks in either direction of rotation, of a reversible internal combustion engine comprising a magneto ignition machine adapted to generate a sustained voltage within the ignition range throughout a portion of the period of revolution of the engine corresponding approximately to twice the angle between the point of normal advanced ignition and the dead center, measured on the crank travel, a spark plug or plugs, and means for distributing the generated voltage to the spark plug or plugs at selected instants during the period of sustained voltage.

3. In an ignition system for reversible internal combustion engines, a magneto-electric generator provided with overlapping magnetic parts to generate in either direction of rotation, a current curve with its maximum value substantially sustained throughout an angle approximately equal to twice the angle between the point of normal advanced ignition and the dead center, measured on the crank travel, substantially as described.

4. In an ignition system for reversible internal combustion engines, a magneto-electric generator of the bobbin type, the pole pieces of the field and the armature of which mutually overlap by an angle 2α approximately equal to twice the angle between the point of normal advanced ignition and the dead center, measured on the crank travel, whereby two overlapping current curves are produced in the two directions of rotation, each having its maximum intensity substantially sustained throughout the angle 2α; substantially as described.

5. In an ignition system for reversible internal combustion engines, a magneto-electric generator of the bobbin type, having its field magnets provided with polar extensions of reduced section, overlapping the armature ends through an angle equal to twice the angle between the dead center of the engine and the point of normal advanced ignition, measured on the crank travel; substantially as described.

6. In an ignition system for reversible internal combustion engines, a magneto-electric generator of the bobbin type, having the pole pieces of the field magnet provided with step-like projections intermediate their ends, which projections overlap the armature core through an angle 2α substantially equal to twice the angle between the dead center of the engine and the point of normal advanced ignition, measured on the crank travel; substantially as described.

7. In an ignition system for reversible internal combustion engines, a magneto-electric generator having pole pieces and armature which overlap by an angle 2α substantially equal to twice the angle between the dead center of the engine and the point of normal advanced ignition, measured on the crank travel, and a current interrupter having relatively movable contacting surfaces, the aggregate angular extent of which is substantially equal to 2α; substantially as described.

In testimony whereof I affix my signature, in presence of two witnesses.

GOTTLOB HONOLD.

Witnesses:
ERNST ULMER,
MAX ANSCHÜTZ.

It is hereby certified that in Letters Patent No. 1,105,787, granted August 4, 1914, upon the application of Gottlob Honold, of Stuttgart, Germany, for an improvement in "Apparatus for Ignition of Reversible Internal-Combustion Motors," an error appears in the printed specification requiring correction as follows: Page 2, lines 42-43 for the words "their fixed" read *fixed their;* and that the said Letters Patent should be read with this correction therein that the same may conform to the record of the case in the Patent Office.

Signed and sealed this 22nd day of September, A. D., 1914.

[SEAL.]
R. F. WHITEHEAD,
*Acting Commissioner of Patents.*